United States Patent
Dondlinger

(10) Patent No.: US 6,827,037 B1
(45) Date of Patent: Dec. 7, 2004

(54) BIRDHOUSE WITH AN ENTRANCE HAVING AN ADJUSTABLE SIZE

(76) Inventor: George W. Dondlinger, 757 Eastern Ave., West Bend, WI (US) 53095

(*) Notice: Subject to any disclaimer, the term of this patent is extended or adjusted under 35 U.S.C. 154(b) by 0 days.

(21) Appl. No.: 10/352,277

(22) Filed: Jan. 29, 2003

Related U.S. Application Data

(60) Provisional application No. 60/382,170, filed on May 21, 2002.

(51) Int. Cl.[7] ............................................. A01K 31/00
(52) U.S. Cl. ...................................................... 119/428
(58) Field of Search ........................... 119/53, 428, 431, 119/432, 433

(56) References Cited

U.S. PATENT DOCUMENTS

| | | | |
|---|---|---|---|
| 2,931,336 A | * | 4/1960 | Cather ........................ 119/52.3 |
| 4,541,362 A | * | 9/1985 | Dehls ......................... 119/57.9 |
| 5,172,651 A | * | 12/1992 | Finn ........................... 119/428 |
| 5,746,156 A | * | 5/1998 | Petrides et al. ............. 119/428 |
| 5,964,183 A | * | 10/1999 | Czipri ........................ 119/52.3 |
| 6,170,437 B1 | * | 1/2001 | Jones ........................... 119/428 |

OTHER PUBLICATIONS

""Dial" Bird House Suits Any Tenant"; Popular Science, Jul. 1939, p. 67.*

* cited by examiner

*Primary Examiner*—Peter M. Poon
*Assistant Examiner*—Bethany L. Griles
(74) *Attorney, Agent, or Firm*—Brannen Law Office, LLC

(57) ABSTRACT

A birdhouse with a changeable effective entrance size and that is easily disassembled is provided. A main body is provided having a top and a bottom, and a main body hole of a first size therebetween. The main body can be round or have a flat side. A roof is connected to the main body top. The birdhouse has a floor removeably connected to the main body bottom. A constrictor plate with a constrictor plate hole of a second size is also provided. The constrictor plate can be slidably held between screw heads and the inside surface of the main body, or can be hingedly connected to the main body. The user moves the constrictor plate between a first position and a second position to change the effective opening size of the entrance. The constrictor plate can have more than one constrictor plate hole.

39 Claims, 8 Drawing Sheets

BIRDHOUSE WITH AN ENTRANCE HAVING AN ADJUSTABLE SIZE

This application claims priority on provisional application No. 60/382,170, filed May 21, 2002.

BACKGROUND OF THE INVENTION

1. Field of the Invention

The present invention relates generally to birdhouses and more specifically to birdhouses that can be easily cleaned out after each season and that have entrances having easily changeable effective entrance sizes.

2. Description of the Related Art

It can be appreciated that manmade birdhouses have been in use for many years, and have been made from many materials. Common birdhouses are made from wood, metal, and even ceramic material.

Conventional wooden birdhouses are highly susceptible to warp and subject to deterioration due to the weather. Conventional metal birdhouses are susceptible to overheating when in direct sunlight, which can harm the birds and birds' eggs. Ceramic material is susceptible to discoloration, deterioration, cracking and chipping, due to freezing.

Another problem associated with coqyeptional birdhouses of all the above materials is that the birdhouses only have a single sized entrance. In order to attract birds of different sizes, a person needs to purchase multiple birdhouses. As an alternative to having multiple wooden birdhouses, the owner can easily increase the size of the entrance by drilling a larger hole. However, this results in a permanent alteration to the birdhouse, which is often undesirable.

Many birdhouses are not easily cleaned. The components of those birdhouses are often permanently bound together, and it can be difficuk, if not impossible, to temporarily disassemble any of those components for cleaning purposes.

Thus, there exists a need to solve these and other problems.

SUMMARY OF THE INVENTION

The present invention has an entrance that has a changeable effective entrance size and that is also easily partially disassembled to facilitate cleaning.

In accordance with one aspect of the present birdhouse invention, a main body is provided having a wall with a top and a bottom, and a main body hole of a first size therebetween. The main body wall has an inside surface. A roof is connected to the top of the main body. The birdhouse also has a floor with a rim, and is removeably connected to the bottom of the main body. A fastener is through the main body and floor rim to hold the floor in place.

In accordance with another aspect of the present invention, a constrictor plate with a constrictor plate hole of a second size is provided. Two screws having respective heads are threaded into the main body wall. The constrictor plate is slideably held between the screw heads and the inside surface of the main body. In an alternative embodiment, the constrictor plate is hingedly connected to the main body.

The constrictor plate moves between a first position and a second position. When in the first position, the birdhouse effective entrance size is equal to the first size of the main body hole. When in the second position, the effective entrance size is equal to the second size of the constrictor plate hole. The constrictor plate can have more than one constrictor plate hole.

The ease of cleaning is apparent. The owner merely has to remove the fastener holding the floor to the main body and then remove the floor in order to clean the birdhouse.

It is no more difficult to change the effective size of the entrance, which is done in the same manner. After removing the floor, the owner simply reaches into the birdhouse and moves the constrictor plate between the first position and second position.

The main body, the roof, the floor and the constrictor plate are considered to be the major components. These components may be made of polyvinyl chloride (PVC). The fasteners are considered the minor components, and may be made of stainless steel. In this regard, the birdhouse of the present invention is highly resistant to warp and decay. Also, the birdhouse is resistant to overheating in direct sunlight. In addition, the birdhouse is not susceptible to cracking or chipping.

Other advantages, benefits, and features of the present invention will become apparent to those skilled in the art upon reading the detailed description of the invention and studying the drawings.

DESCRIPTIONS OF THE PREFERRED EMBODIMENTS

Figure 1:
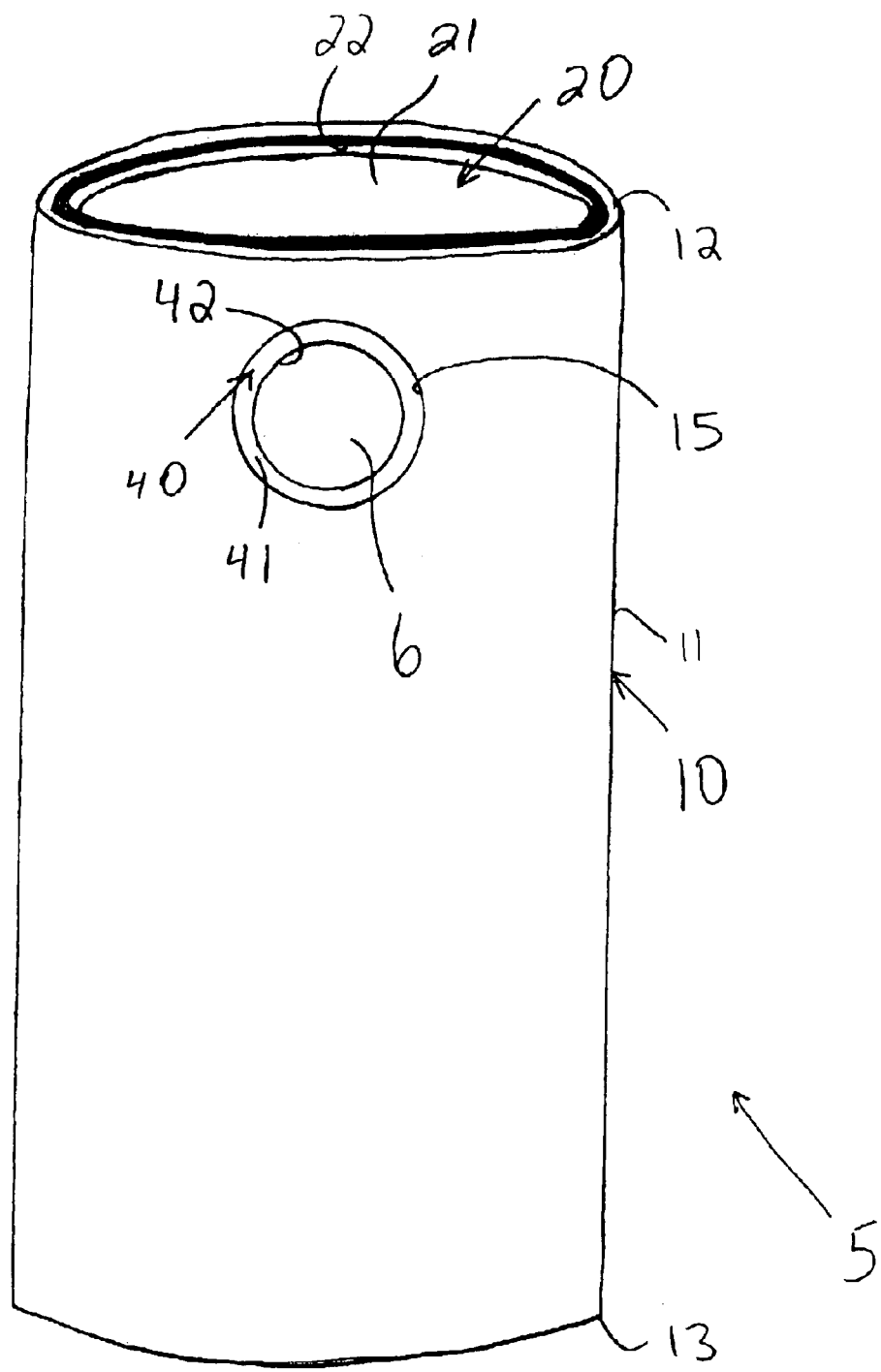
FIG. 1 is a perspective view of one embodiment of the present invention showing the roof in place and the entrance effective opening size equal to the constrictor plate hole.

While the invention will be described in connection with a preferred embodiment, it will be understood that it is not intended to limit the invention to that embodiment. On the contrary, it is intended to cover all alternatives, modifications and equivalents as may be included within the spirit and scope of the invention as defined in the appended claims.

The present invention is generally noted with numeral 5. The birdhouse 5 has an entrance 6 having a changeable effective entrance size.

The birdhouse 5 has a main body 10, as shown in FIGS. 1–5. The main body 10 is preferably made from PVC. However, other plastics or other materials that are weather resistant can be used without departing from the broad aspects of the present invention. The illustrated main body is preferably made from generally round PVC tubing. However, materials having different cross-sectional shapes, including shapes with a flat surface, could be used.

As shown in FIGS. 1 and 3–5, the main body 10 has a wall 11 with a top 12 and a bottom 13 and a main body hole 15 therebetween. The main body hole 15 is preferably circular, and has a first predetermined size, with a diameter of approximately between about one and two inches. However, circles of other diameters, or other shaped holes altogether, such as rectangular or ovular, can be used without departing from the broad aspects of the invention. The wall 11 is preferably drilled to form the circular hole 15. The top 12 and bottom 13 define the main body height. The height can be any length suitable for a birdhouse. It has been found suitable to simply cut the tubing to a desired length with a saw or the like. The main body wall 11 has an outside surface and an inside surface 14. A screw hole 16 is through the main body wall 11 near the main body bottom 13. A hanger hole 17 is through the main body wall 11 near the main body top 12. The hanger hole 17 can receive the free end of a nail or the like in order to support the birdhouse 5. The screw hole 16 and hanger hole 17 are preferably located on the same side of the birdhouse 5, and preferably on the opposite side from the entrance 6.

Figure 5:
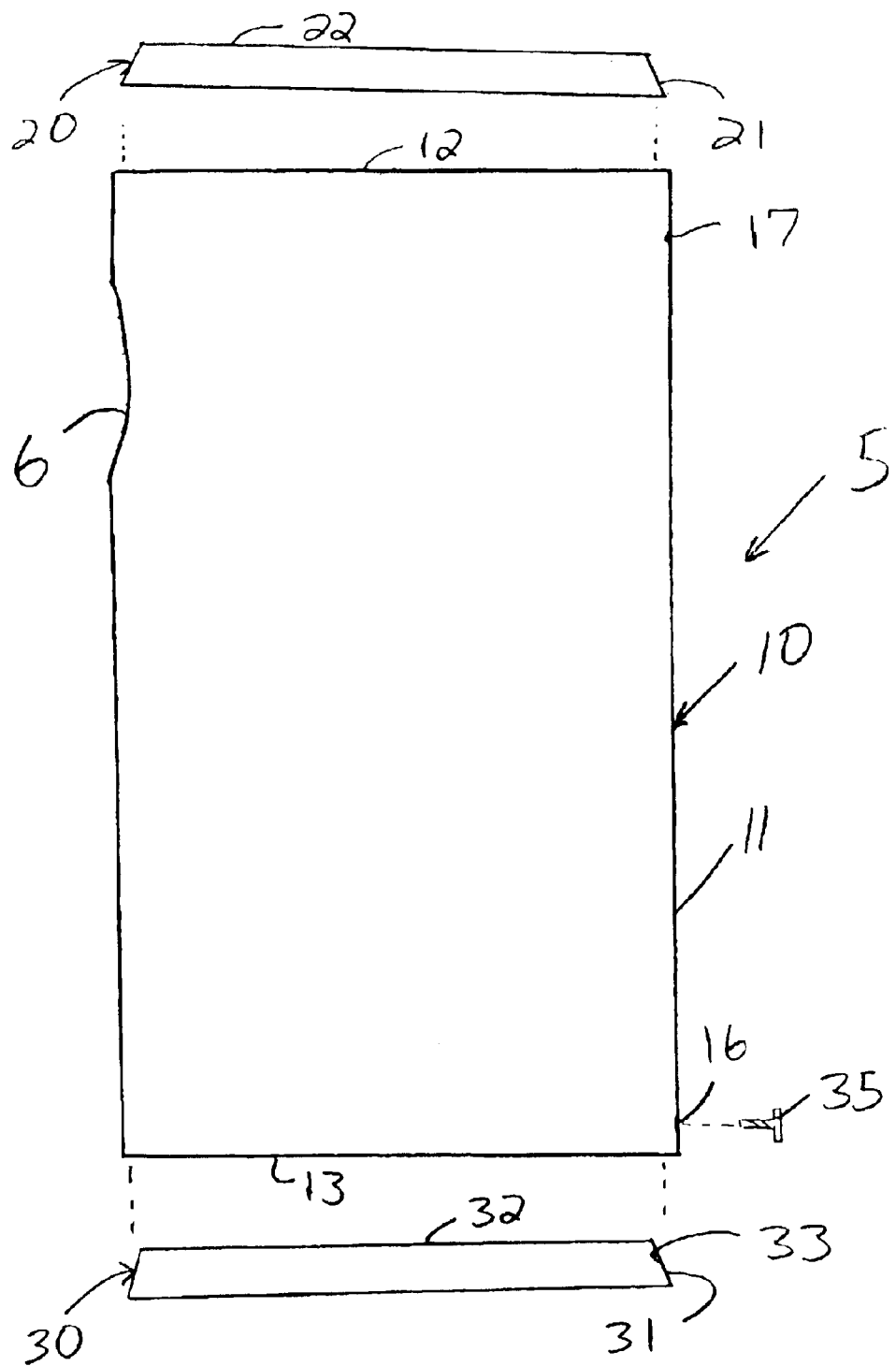
FIG. 5 is an exploded side view of the present invention.

A roof 20 is provided having a plate 21 and a rim 22, and is best shown in FIG. 5. The roof 20 covers the top of the main body 10. The plate 21 prevents water and the like from entering the main body 10. Rim 22 is preferably slightly outwardly tapered. The rim 22 engages the inside surface 14 of the main body wall 1. The roof 20 can be held in place with friction alone, by simply pressing the roof 20 flush into the main body 10. In this regard, the rim 22 can be slightly deflected towards an orientation perpendicular with the plate 21. However, in order to provide a more stable birdhouse 5, the roof 20 is preferably fastened to the top 12 of the main body 10. One suitable fastener is glue. Other suitable fasteners could include caulk or screws. Glue or caulk is preferable because they can form a watertight seal between the roof 20 and the main body 10.

One item that makes a suitable roof 20 is a standard plug for PVC tubing, which is sized to snugly fit within the end of the PVC tubing. The roof 20 can be made of molded plastic, or of PVC.

As an alternative (not shown), the diameter of the roof could be increased so that the rim would engage the outside surface of the main body wall 11 rather than the inside surface 14 of the main body wall 11. In this case, the usC of a fastener such as glue, caulk or one or more screws would be advantageous to assist in keeping the roof 20 in place.

Figure 3:
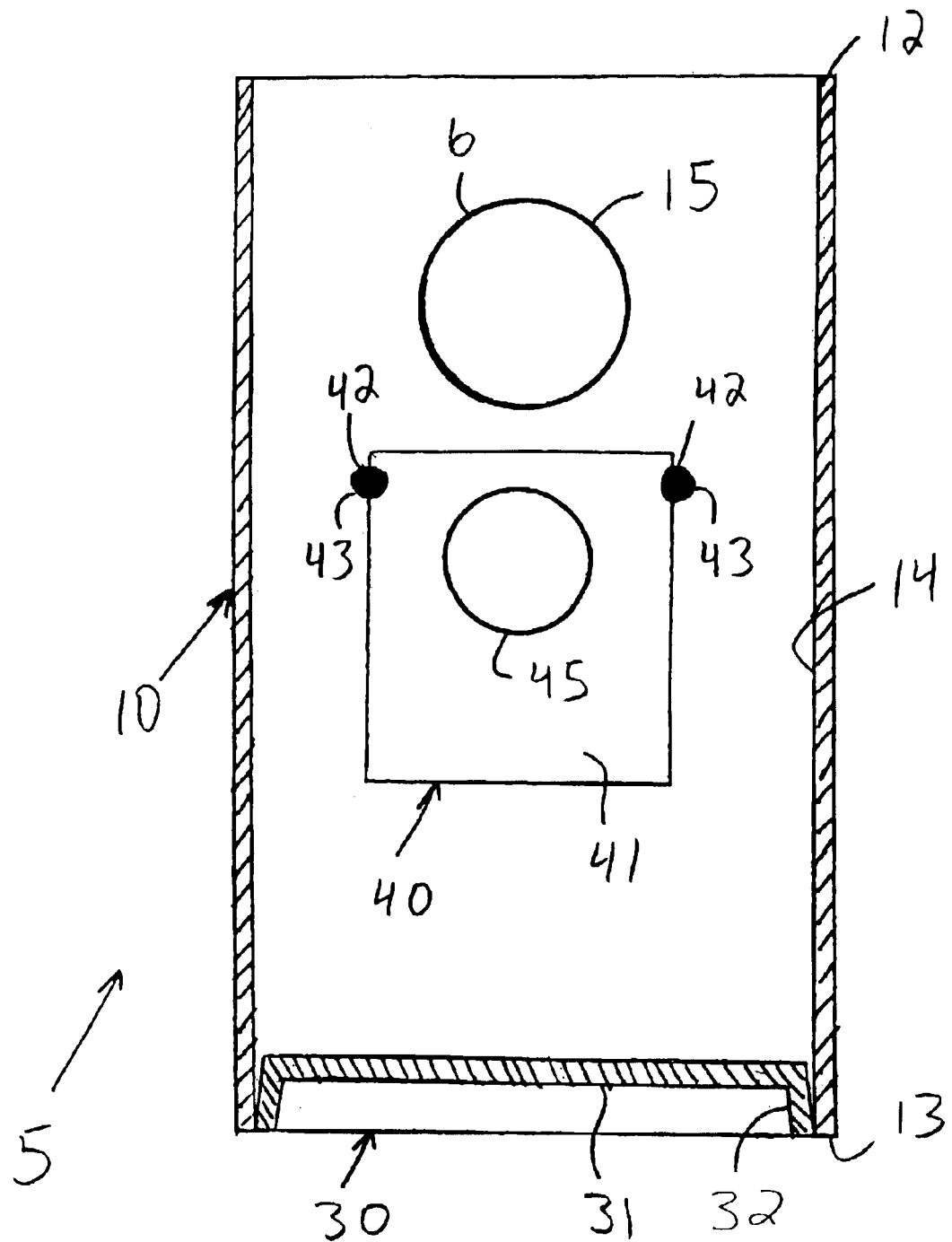
FIG. 3 is a cross-sectional view taken along line 3—3 in FIG. 2, and showing the constrictor plate in a first position.
Figure 4:
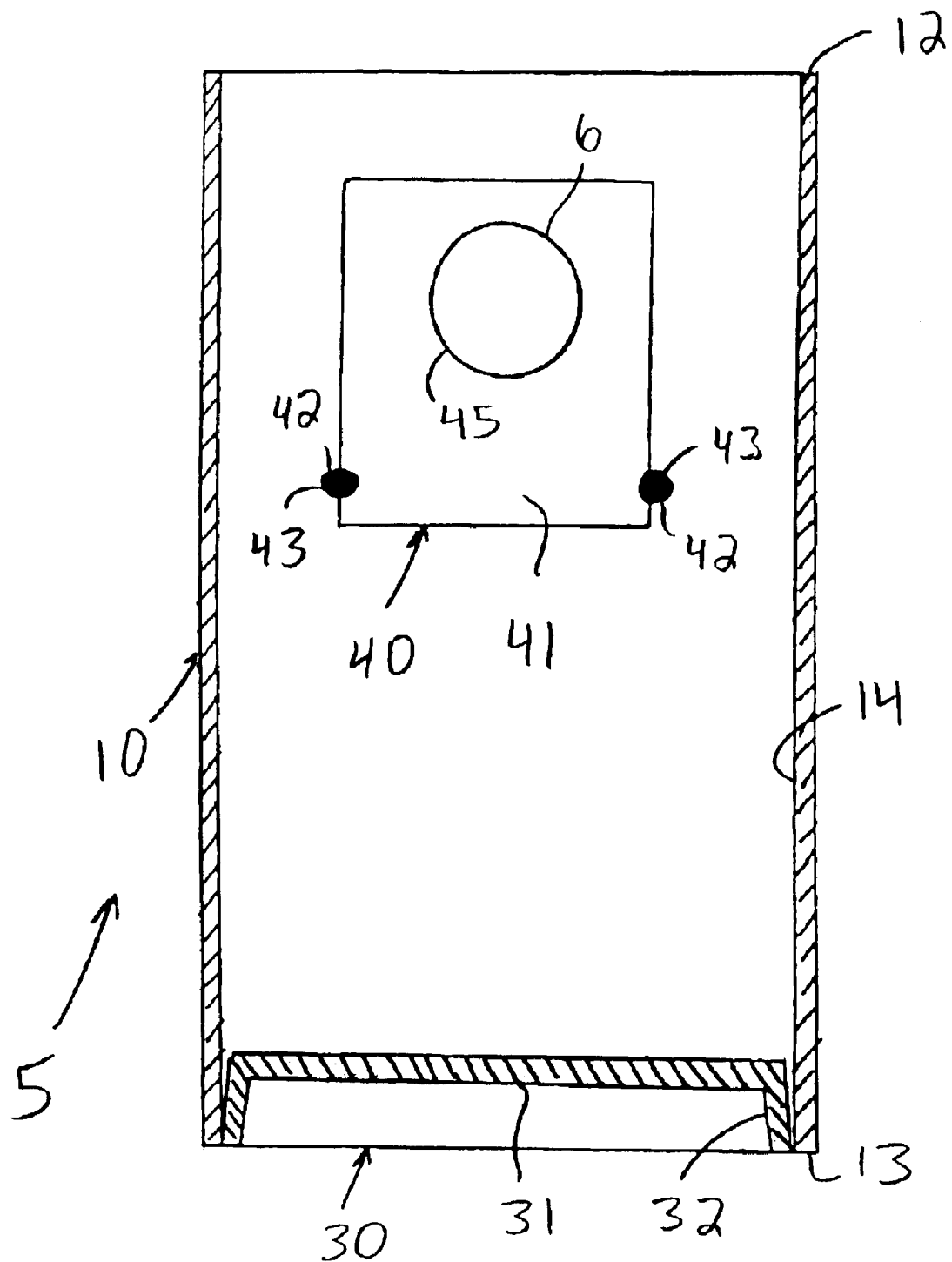
FIG. 4 is similar to FIG. 3, but shows the constrictor plate in a second position.

A floor 30 is provided having a plate 31 and a rim 32, and is shown in FIGS. 3–5. The floor 30 is preferably also a PVC tubing plug, and is preferably identical in size to the roof 20. The floor 30 is preferably removeably connected to the bottom 13 of the main body 10. This can be accomplished by drilling a hole 33 through the rim 32 of the floor 30. The size of the hole 33 should be sufficient such that the threads of a screw 35 are engaged. Hole 33 of the floor 30 is aligned with hole 16 of the main body 10, and the screw 35 is simply inserted through those holes to secure the floor 30 to the bottom 13 of the main body 10. The threads of screw 35 do not need to actively engage hole 16 in the main body wall 11. There is also some friction between the floor 30 and the main body 10 that helps to keep the floor 30 in place. As is the case with the roof, the rim 32 can deflect from its normally tapered shape a small amount with respect to the plate 31.

Figure 6:
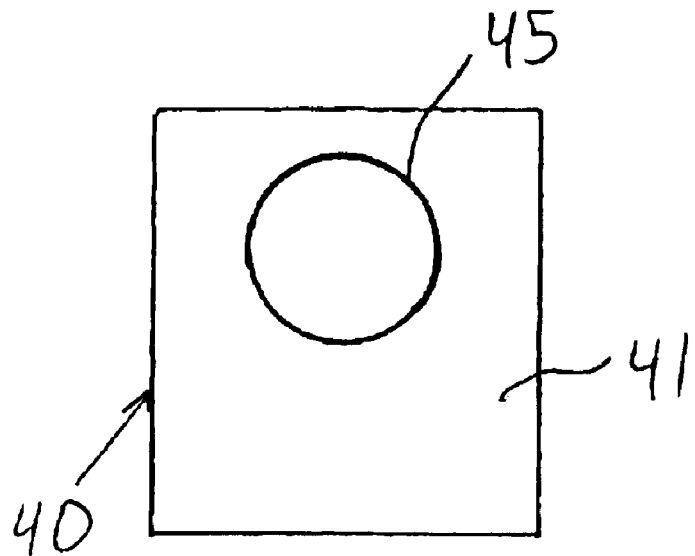
FIG. 6 is a front view of the constrictor plate.
Figure 7:
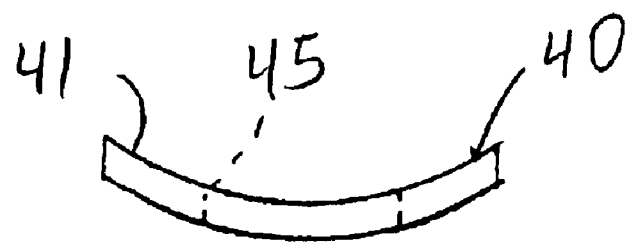
FIG. 7 is a top view of FIG. 6.

One other major component is a constrictor plate 40, and is shown in FIGS. 24, 6, and 7. The constrictor plate 40 has a wall 41 with has a constrictor plate hole 45 therethrough having a second size, which is smaller that the size of hole 15. The constrictor plate hole 45 is preferably shaped like the shape of the main body hole IS. The constrictor plate 40 is preferably either a piece of PVC tubing or of molded plastic. However, other materials could be used without departing from the broad aspects of the invention.

Figure 8:
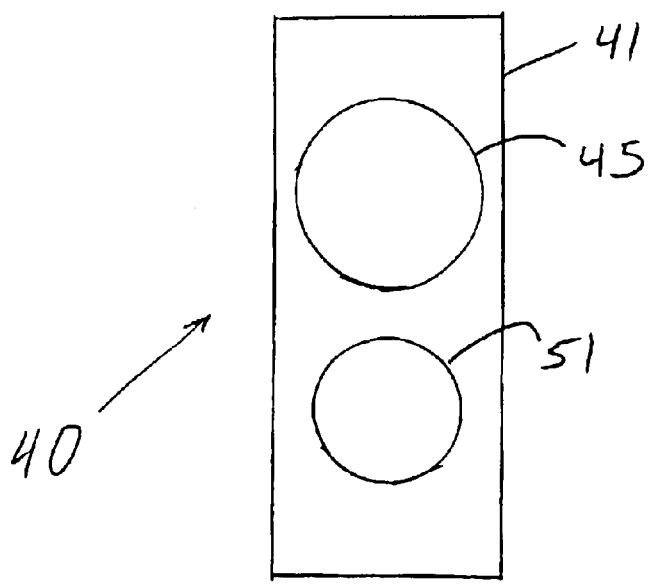
FIG. 8 is a front view of an alternative embodiment of the present invention, showing a constrictor plate with multiple holes.

Turning now to FIG. 8, an alternative embodiment of the constrictor plate 40 is provided. The constrictor plate 40 has a hole 51 therethrough in addition to hole 45. Although only one additional hole 51 is shown, many additional holes (not shown) can be through the constrictor plate 40 so that the constrictor plate can form an entrance 6 having an even greater number of effective opening sizes. Hole 51 is preferably smaller than hole 45, however, it could be larger than hole 45 if desired. Also, the hole 51 is preferably circular, but can be any other desired shape without departing from the broad aspects of the invention.

Figure 2:
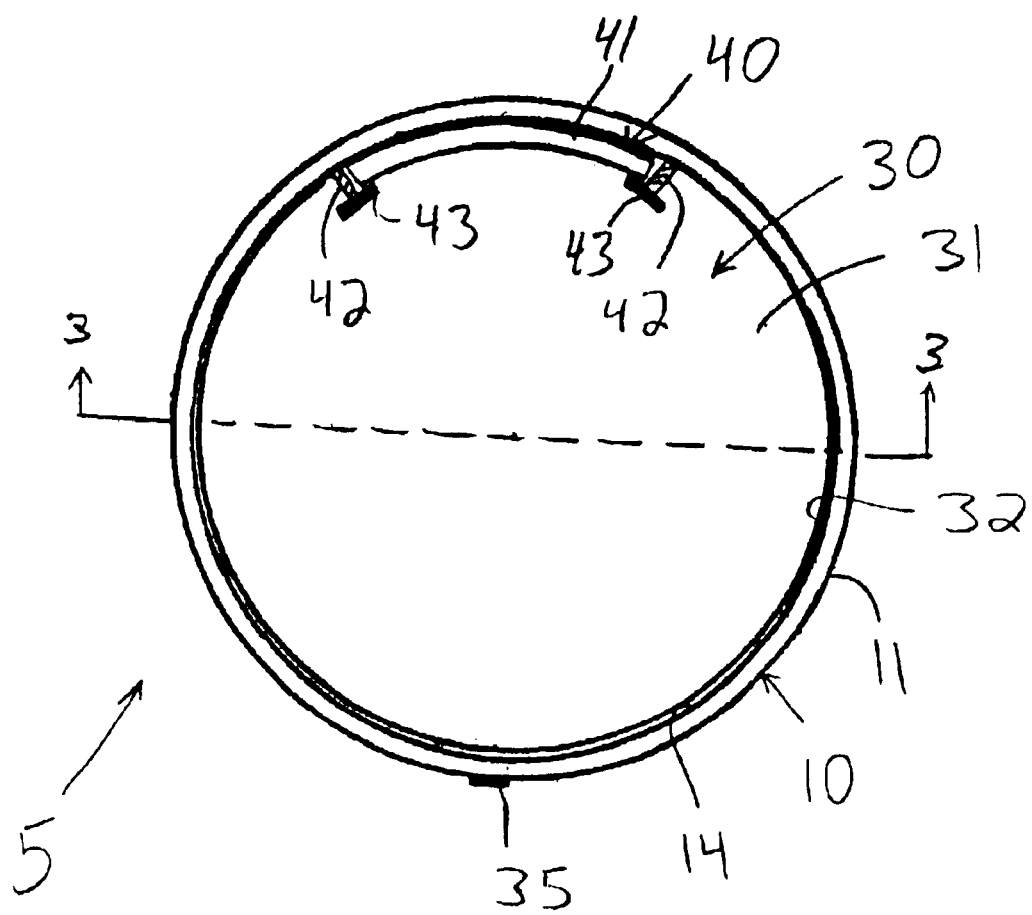
FIG. 2 is a top view of the present invention with the roof removed.

The constrictor plate 40 is preferably shaped complimentary to the inside surface 14 of the main body wall 11, as is best shown in FIG. 2. In this regard, the constrictor plate 40 is preferably arcuate shaped in order to be positioned flush against the inside surface 14 of the main body wall 11. In one illustrated embodiment, two holder screws 42 are provided. The screws 42 each have respective heads 43. The screws 42 are spaced apart, such that the constrictor plate 40 is frictionally held in place between the heads of the screws 42 and the inside surface 14 of the main body wall 11. The screws 42 and inside surface 14 of the main body wall 11 form a track in which the constrictor plate 40 can slide. The screws 42 frictionally hold the constrictor plate 40 in moving engagement with respect to the main body 10. As an alternative to the screws 42, a nylon spacer (not shown) with two L-shaped legs that form a track can be secured to the main body 10, and preferably to the inside surface 14 of the main body wall 11. The nylon spacer can be glued, caulked, screwed or otherwise connected to the main body 10. The nylon spacer has a track in which the constrictor plate 40 can slide.

In use, the user can easily clean the birdhouse 5. This is accomplished in the preferred embodiment by removing the screw 35 holding the floor 30 in place, and removing the floor. With the floor 30 removed, the user can also easily change the effective opening size of the entrance 6. This is accomplished by reaching into the main body 10 from the bottom end 13 and moving the constrictor plate 30 relative to the main body 10. It is noted that the roof 20 could alternatively be removeably connected to the main body 10 instead of the floor 30. In this regard, it should be apparent that access to the inside of the main body 10 can be gained either through the roof 20 or floor 30, or both.

The constrictor plate 40 can be in a first position below the main body hole 15, as shown in FIG. 3. In this first position, the constrictor plate 40 does not impede, constrict, or interfere with entry to the birdhouse through the main body hole 45. In this regard, the effective opening size of the entrance hole 6 is equal to the size of the main body hole. The constrictor plate 40 can also be in a second position relative to the main body 10 wherein the constrictor plate substantially covers the main body hole 15, as shown in FIGS. 1 and 4. In this case, the effective size of the entrance hole is determined by the constrictor plate hole 45, and is equal in size to the constrictor plate hole 45.

When the constrictor plate has hole 51 in addition to hole 45, it is understood that the constrictor plate 40 is positionable with respect to the main body 10 so that each hole 51 and 45 is positionable over the main body hole 15. In this regard, the main body hole 15 is located a predetermined distance from the top 12 of the main body 10 such that, if vertically movable, the constrictor plate 40 has room to move to enable each hole 45 or 51 to constrict the main body hole 15.

It is understood that the constrictor plate 40 can be positioned to partially limit entry into the birdhouse 5 through the main body hole 15. In this case (not shown), the effective size of the entrance hole is not generally equal in shape and size to either the main body hole 15 or the constrictor plate hole 45. Rather, the wall 41 partially impedes access through hole 15.

While the constrictor plate 40 is shown and described as being vertically slidable relative to the main body 10, it is contemplated that the constrictor plate 40 could also slide horizontally relative to the main body 10. Further, the constrictor plate 40 can alternatively be on the outside surface of the main body 10, rather than on the inside surface 14.

With respect to screw 35 and screws 42, they are preferably made of stainless steal. However, plastic, brass or metal screws, or screws of many different types of material can be used without departing from the broad aspects of the invention.

Figure 9:
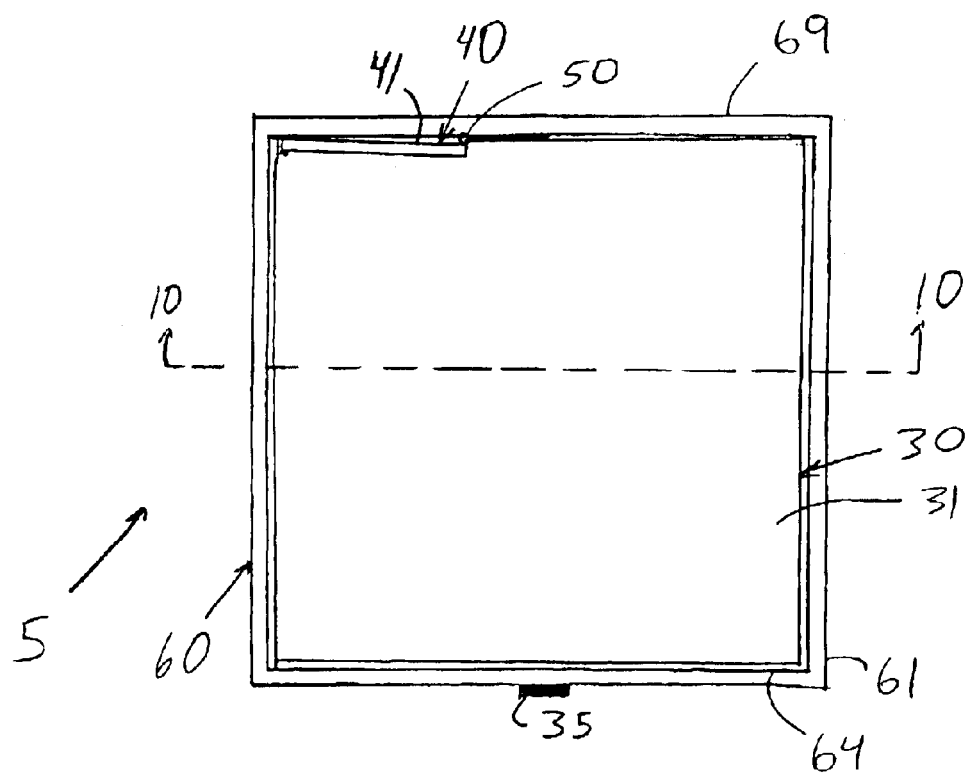
FIG. 9 is a top view of an alternative embodiment of the present invention with the top removed.
Figure 10:
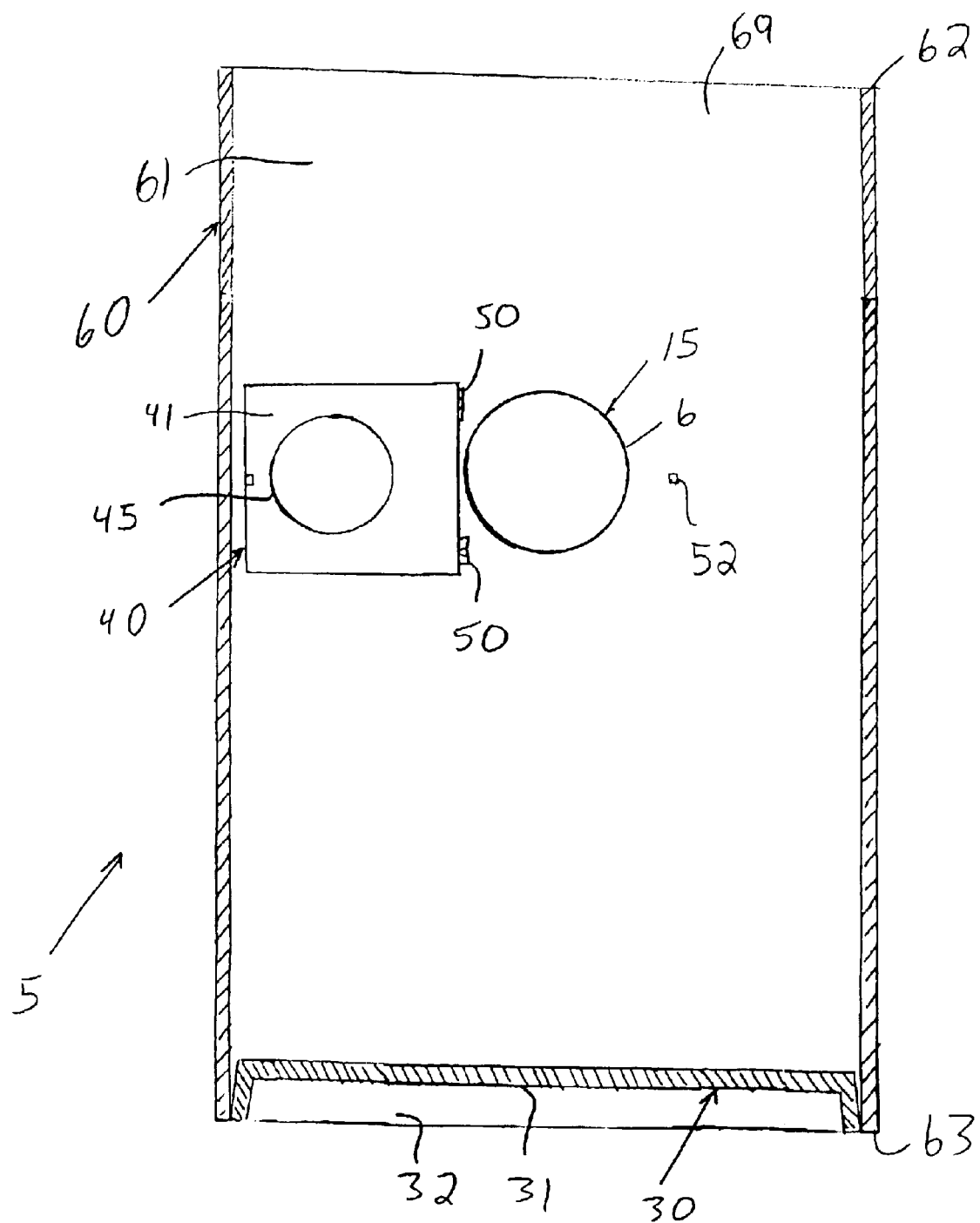
FIG. 10 is a cross-sectional view taken along line 10—10 in FIG. 9, and shows the constrictor plate hingedly connected to the main body.

Turning now to FIGS. 9 and 10, an alternative main body 60 is provided. Main body 60 is shown to be generally rectangular in shape. However, only one flat side 69 is required in this embodiment. The main body 60 has a wall 61 with a top 62 and a bottom 63. The wall 61 has an inside surface 64. A hole 65 is through the wall 61, preferably on a flat side 69. A screw hole 66 and hanging hole 67 are provided. Main body 60 is similar to main body 10 in most respects except cross-sectional shape. The constictor plate 40 is shaped complimentary to the wall 61. In this regard, the constrictor plate 40 is flat. Of course, a roof (not shown) and the floor 30 are shaped to be received within the top 62 and 63, respectively, of the main body 60.

The constrictor plate 40 can be either vertically or horizontally slidingly engaged to the main body 60. The constrictor plate 40 can also be hingedly connected to the main body 60 with a hinge 50. In FIG. 10, the constrictor plate 40 is shown to open left of the main body hole 15. However, the constrictor plate 40 can also open right, up or down with respect to the main body hole 15. In this regard, the constrictor plate 40 can be either vertically or horizontally hingedly connected to the main body 60. A latch 52 is provided for keeping the constrictor plate 40 in the closed position over the main body hole 15.

Thus it is apparent that there has been provided, in accordance with the present invention, a birdhouse with an entrance having a changeable effective opening size that fully satisfies the objects, aims and advantages as set forth above. While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

I claim:

1. A birdhouse with an entrance having a selectably changeable effective entrance size comprising:
   A. a main body with a main body hole having a first size and for allowing a bird to completely enter said main body; and
   B. a constrictor plate connected to said main body and having a first constrictor plate hole through said constrictor plate having a second size and a second constrictor plate hole through said constrictor plate having a third size, said constrictor plate being moveable between a first position, a second position and a third position relative to said main body,
   wherein said birdhouse effective opening size is equal to said first size of said main body hole when said constrictor plate is in said first position, said birdhouse effective opening size is equal to said second size of said first constrictor plate hole when said constrictor plate is in said second position, and said birdhouse effective opening size is equal to said third size of said second constrictor place hole when said constrictor place is in said third position.

2. The birdhouse of claim 1 wherein:
   A. said main body has an inside surface; and
   B. said constrictor plate is connected to said inside surface of said main body.

3. The birdhouse of claim 2 wherein at least two screws are attached to said inside surface of said main body and that have respective screw heads to connect said constrictor plate to said main body.

4. The birdhouse of claim 3 wherein said constrictor plate is slideable relative to said inside surface of said main body.

5. The birdhouse of claim 4 wherein said constrictor plate is vertically slideable relative to said inside surface of said main body.

6. The birdhouse of claim 1 wherein said main body is a generally tubular shaped main body, and said constrictor plate is a generally arcuate shaped constrictor plate that complements said tubular shaped main body.

7. The birdhouse of claim 1 wherein said main body has at least one flat side.

8. The birdhouse of claim 7 wherein said birdhouse is generally rectangularly shaped.

9. The birdhouse of claim 7 wherein said constrictor plate is hingedly connected to one of said at least one flat side of said main body.

10. The birdhouse of claim 9 wherein said constrictor plate is hingedly connected upon a vertical axis to said one of said at least one flat side of said main body.

11. The birdhouse of claim 1 wherein said main body comprises PVC.

12. The birdhouse of claim 1 wherein said main body entrance hole and said constrictor hole are generally circular shaped.

13. The birdhouse of claim 1 wherein:
   A. said main body further comprises a top and a bottom; and
   B. said birdhouse further comprising a roof connected to said top of said main body and a floor removeably connected to said bottom of said main body.

14. The birdhouse of claim 13 wherein a screw removeably connects said floor to said main body.

15. A method of using a birdhouse comprising the steps of:
   A. providing a birdhouse with a main body having a main body hole, a constrictor plate in moving engagement with the main body and having a first constrictor plate hole through said constrictor plate and a second constrictor plate hole through said constrictor plate, a roof and a floor connected to the main body; and
   B. moving the constrictor plate from a first position relative to the main body where complete entry to the birdhouse is unimpeded by the constrictor plate, to one of a second position relative to the main body where the constrictor plate impedes access to the birdhouse such that entry to the birdhouse is through the first constrictor plate hole and a third position relative to the main body where the constrictor plate impedes access to the birdhouse such that entry to the birdhouse is through the second constrictor plate hole.

16. The method of claim 15 wherein the step of moving the constrictor plate comprises the step of sliding the constrictor plate from a first position relative to the main body to a second position relative to the main body.

17. The method of claim 16 wherein the step of moving the constrictor plate comprises the step of vertically sliding the constrictor plate from a first position relative to the main body to a second position relative to the main body.

18. The method of claim 16 wherein:
A. the step of providing a birdhouse further comprises the step of providing a pair of screws with respective heads; and
B. the step of moving the constrictor plate comprises the step of sliding the constrictor plate between the main body and respective screw heads.

19. The method of claim 15 wherein the step of providing a birdhouse comprises the step of providing a main body with a flat side and the step of providing a main body hole comprises the step of providing a main body hole on the flat side.

20. The method of claim 15 wherein:
A. the step of providing a birdhouse further comprises the step of providing a screw to hold the floor to the main body; and
B. the method of using a birdhouse further comprises the step removing the screw and removing the floor from the main body.

21. The method of claim 20 comprising the further step of reaching into the main body to move the constrictor plate between the first position and the second position.

22. The method of claim 15 wherein the step of providing a birdhouse further comprises the step of providing the birdhouse made of PVC.

23. A birdhouse having a birdhouse entrance hole having an adjustable effective entrance size and comprising:
A. a main body with a main body hole located between a main body top and a main body bottom;
B. a vertically slideable constrictor plate connected to said main body having a plurality of constrictor plate holes therethrough for selectively reducing said effective entrance size of said birdhouse entrance hole through which a bird of a selected size can completely enter;
C. a roof connected to said top of said main body; and
D. a floor connected to said bottom of said main body, wherein at least one of said roof and said floor is removeably connected to said main body.

24. The birdhouse of claim 23 wherein a first screw removeably connects said floor to said bottom of said main body.

25. The birdhouse of claim 24 wherein:
A. said floor has a plate and a rim;
B. a first hole is through said main body near said bottom of said main body and a second hole is through said rim of said floor; and
C. said first screw is insertable through said first hole and through said second hole to removeably connect said floor to said main body.

26. The birdhouse of claim 23 wherein said roof is a plug with a rim, and is held in place at said top of said main body by friction between said roof and said main body.

27. The birdhouse of claim 23 wherein
A. said main body has an inside surface; and
B. said birdhouse further comprises a pair of second screws having respective heads that frictionally hold said constrictor plate against said inside surface of said main body.

28. The birdhouse of claim 23 wherein said constrictor plate is moveable relative to said main body from a first position where said constrictor plate does not constrict said effective opening size of said birdhouse entrance hole to a second position where said constrictor plate constricts said effective opening size of said birdhouse entrance hole.

29. The birdhouse of claim 28 wherein said constrictor plate is vertically slideable relative to said main body from a first position where said constrictor plate does not constrict said effective opening size of said birdhouse entrance hole to a second position where said constrictor plate constricts said effective opening size of said birdhouse entrance hole.

30. The birdhouse of claim 23 wherein:
A. said main body has at least one flat side; and
B. said main body hole is through one of said at least one flat side.

31. The birdhouse of claim 30 wherein said constrictor plate is hingedly connected to said one of said at least one flat side of said main body.

32. A birdhouse with an entrance having a selectably changeable effective entrance size comprising:
A. a main body with a main body hole having a first size and wherein said main body has an inside surface; and
B. a constrictor plate connected to said inside surface of said main body and having a constrictor plate hole having a second size, said constrictor plate being moveable between a first position and a second position relative to said main body,
wherein said birdhouse effective opening size is equal to said first size of said main body hole when said constrictor plate is in said first position, said birdhouse effective opening size is equal to said second size of said constrictor plate hole when said constrictor plate is in said second position, and
wherein at least two screws are attached to said inside surface of said main body, said at least two screws have respective screw heads to connect said constrictor plate to said main body.

33. The birdhouse of claim 32 wherein said constrictor plate is slideable relative to said inside surface of said main body.

34. The birdhouse of claim 33 wherein said constrictor plate is vertically slideable relative to said inside surface of said main body.

35. A method of using a birdhouse comprising the steps of:
A. providing a birdhouse with a main body having a main body hole, a constrictor plate in moving engagement with the main body and having a first constrictor plate hole, a roof and a floor connected to the main body, and a pair of screws with respective heads being connected to the main body; and
B. moving the constrictor plate from a first position relative to the main body where complete entry into the birdhouse is unimpeded by the constrictor plate, to a second position relative to the main body where the constrictor plate impedes access to the birdhouse such that complete entry into the birdhouse is through the first constrictor hole, wherein the step of moving the constrictor plate comprises the step of sliding the constrictor plate between the main body and the respective heads of the screws from a first position relative to the main body to a second position relative to the main body.

36. A method of using a birdhouse comprising the steps of:

A. providing a birdhouse with a main body having a main body hole, a constrictor plate in moving engagement with the main body and having a first constrictor plate hole, a roof and a floor connected to the main body, and a screw to hold the floor to the main body;

B. removing the screw and removing the floor from the main body and reaching into the main body to be able to move the constrictor plate between a first position relative to the main body where entry to the birdhouse is unimpeded by the constrictor plate and a second position relative to the main body where the constrictor plate impedes access to the birdhouse such that entry to the birdhouse is through the first constrictor hole; and C. moving the constrictor plate from the first position to the second position.

37. A birdhouse having a birdhouse entrance hole having an adjustable effective entrance size and comprising:

A. a main body with a main body hole located between a main body top and a main body bottom and having an inside surface, said main body hole allowing for a bird to completely enter said birdhouse;

B. a constrictor plate connected to said main body for selectively reducing said effective entrance size of said birdhouse entrance hole;

C. a roof connected to said top of said main body;

D. a floor connected to said bottom of said main body; and

E. a pair of second screws having respective heads that frictionally hold said constrictor plate against said inside surface of said main body, wherein at least one of said roof and said floor is removeably connected to said main body.

38. A birdhouse with an entrance having a selectably changeable effective entrance size comprising:

A. a main body with a main body hole having a first size for allowing a bird to completely enter said birdhouse, wherein said main body is a generally tubular shaped main body; and B. a constrictor plate connected to said main body and having a constrictor plate hole having a second size, said constrictor plate being moveable between a first position and a second position relative to said main body, wherein said constrictor plate is a generally arcuate shaped constrictor plate that compliments said tubular shaped main body, wherein said birdhouse effective opening size is equal to said first size of said main body hole when said constrictor plate is in said first position, and said birdhouse effective opening size is equal to said second size of said constrictor plate hole when said constrictor plate is in said second position.

39. A method of using a birdhouse comprising the steps of:

A. providing a birdhouse with a main body having a generally arcuate cross-section and having main body hole, a constrictor plate that is shaped generally complementary to the main body and that is in moving engagement with the main body and having a first constrictor plate hole, a roof and a floor connected to the main body; and B. moving the constrictor plate from a first position relative to the main body where completely entry into the birdhouse is unimpeded by the constrictor plate, to a second position relative to the main body where the constrictor plate impedes access to the birdhouse such that complete entry into the birdhouse is through the first constrictor hole.

* * * * *